(12) United States Patent  (10) Patent No.: US 8,480,794 B2
Ilkenhans et al.  (45) Date of Patent: Jul. 9, 2013

(54) ADSORPTION OF VOLATILE ORGANIC COMPOUNDS DERIVED FROM ORGANIC MATTER

(75) Inventors: Thomas Ilkenhans, Oxford (GB); Stephen Poulston, Reading (GB); Andrew William John Smith, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/031,429

(22) Filed: Feb. 21, 2011

(65) Prior Publication Data

US 2011/0139002 A1  Jun. 16, 2011

Related U.S. Application Data

(63) Continuation of application No. 12/092,382, filed as application No. PCT/GB2006/050354 on Oct. 26, 2006, now Pat. No. 7,910,773.

(30) Foreign Application Priority Data

Nov. 1, 2005  (GB) .................................. 0522229.4

(51) Int. Cl.
 *B01D 53/02* (2006.01)
(52) U.S. Cl.
 USPC .......................................................... 95/141
(58) Field of Classification Search
 USPC .......................................................... 95/141
 See application file for complete search history.

(56) References Cited

U.S. PATENT DOCUMENTS 4,331,693 A  5/1982  Wojciechowski et al.
2002/0086793 A1*  7/2002  Labarge et al. ................. 502/67

FOREIGN PATENT DOCUMENTS

| DE | 4433120 | * | 3/1955 |
| DE | 44 33 120 A1 | | 3/1995 |
| EP | 0 261 422 A2 | | 3/1988 |
| EP | 0 261 442 A3 | | 3/1988 |
| EP | 0 755 714 A2 | | 1/1997 |
| EP | 0 755 714 A3 | | 1/1997 |
| EP | 755714 | * | 7/1997 |
| EP | 0 818 238 A1 | | 1/1998 |
| EP | 818238 | * | 1/1998 |
| EP | 0 938 925 A1 | | 9/1999 |
| EP | 0 947 236 A1 | | 10/1999 |
| EP | 947236 | * | 10/1999 |
| EP | 1 525 802 A1 | | 4/2005 |
| EP | 1525802 | * | 4/2005 |

(Continued)

OTHER PUBLICATIONS

Leon A. Terry et al., "Development of new palladium-promoted ethylene scavenger," *Postharvest Biology and Technology* 45 (2007) 214-220.

*Primary Examiner* — Deborah D Carr
(74) *Attorney, Agent, or Firm* — Lisa A. Chiarini; Hughes Hubbard & Reed LLP

(57) ABSTRACT

A method for adsorbing volatile organic compounds (VOCs) derived from organic matter comprises adsorbing the VOCs onto palladium doped ZSM-5, optionally at ambient temperature. The organic matter can be perishable organic goods such as food, including fruit and/or vegetables, horticultural produce, including plants and/or cut flowers, or refuse. The palladium doped ZSM-5 has a Si:Al ratio of less than or equal to 100:1 and preferably has a palladium content of from 0.1 wt % to 10.0 wt % based on the total weight of the doped ZSM-5.

30 Claims, 5 Drawing Sheets

FOREIGN PATENT DOCUMENTS

| | | |
|---|---|---|
| GB | 2 163 637 A | 3/1986 |
| GB | 2 252 968 A | 8/1992 |
| JP | 60-201252 A | 10/1985 |
| JP | 2-233381 A | 9/1990 |
| JP | 2-261341 A | 10/1990 |
| JP | 03280827 | 12/1991 |
| JP | 6-210165 A | 8/1994 |
| JP | 07080291 | 3/1995 |
| JP | 0924272 | 1/1997 |
| JP | 09313935 | 12/1997 |
| JP | 10249209 | 9/1998 |
| JP | 2000-4783 A | 1/2000 |
| JP | 2005054086 | 3/2005 |

\* cited by examiner

ADSORPTION OF VOLATILE ORGANIC COMPOUNDS DERIVED FROM ORGANIC MATTER

CROSS-REFERENCE TO RELATED APPLICATIONS

This application is a continuation application of U.S. patent application Ser. No. 12/092,382, filed May 1, 2008, which is the U.S. National Phase application of PCT International Application No. PCT/GB2006/050354, filed Oct. 26, 2006, and claims priority of British Patent Application No. 0522229.4, filed Nov. 1, 2005, the disclosures of all of which are incorporated herein by reference in their entirety for all purposes.

FIELD OF THE INVENTION

This invention relates to the adsorption of volatile organic compounds (VOCs) derived from organic matter. More particularly, the organic matter can be perishable organic goods, such as food.

BACKGROUND OF THE INVENTION

VOCs are a wide ranging class of compounds including environmental pollutants such as certain components of car exhaust gases, solvents and aerosol gases, but also including a range of compounds that are derived from organic matter. One example of a VOC derived from organic matter is ethylene, a plant hormone that causes ripening, whilst another example is trimethylamine, a gas commonly given off by fish as it decomposes.

The removal of VOCs derived from organic matter is of interest for a variety of applications. The adsorption of ethylene can prevent undesired ripening and softening, loss of colour, loss of leaves and sprouting to occur in fruit and vegetables, and it is also known to prevent other food and horticultural products from perishing prematurely, and can help eliminate unpleasant smells.

Various methods have been used to oxidise or combust VOCs using Pt on $Al_2O_3$ or $KMnO_4$. However, although these systems are efficient for the removal of VOCs, they have disadvantages associated with their use. Pt on $Al_2O_3$ works by catalytically combusting the ethylene at elevated temperatures; therefore, Pt on $Al_2O_3$ needs to be used in a heated unit separate from the source of the VOCs (see for example GB 2 163 637 A and U.S. Pat. No. 4,331,693). $KMnO_4$ cannot remove VOCs efficiently from humid environments (see Example 4). Since organic matter, such as food, cannot be heated without being altered and inherently exudes moisture, such systems are unsuitable for use in removing VOCs derived from organic matter.

Other methods used to remove VOCs are suited for use at lower temperatures; these include the use of high surface area supports, usually in conjunction with a promoter, for the adsorption of VOCs. For Example, JP 2-261341 discloses the adsorption of ethylene from refrigerated storage compartments, JP 2-233381 discloses an ethylene adsorption film and JP 2000-004783 discloses a combined ethylene adsorber, deodoriser and anti-bacterial product for use in a refrigerator. Specific support materials are not disclosed in any of these publications, instead activated carbon and metal oxides are stated as being generally suitable for use as supports. GB 2 252 968 A relates to an adsorber comprising a sepiolite in combination with a zeolite, and optionally a metal selected from the platinum group metals, the iron group metals, group I metals, group VII metals and the rare earth metals. The most preferred zeolites for use in the invention described in GB '968, are silicalites because their alumina content is almost zero.

SUMMARY OF THE INVENTION

We have now developed a catalyst system capable of removing VOCs derived from organic matter at ambient temperatures, or temperatures at which organic goods such as food are chilled or refrigerated to prolong shelf life, by adsorbing said gases more efficiently than by those systems disclosed in the prior art.

In accordance with a first aspect of the present invention, there is provided a method for adsorbing VOCs derived from organic matter comprising the step of adsorbing the VOCs onto palladium doped ZSM-5, wherein the Si:Al ratio of the ZSM-5 is less than or equal to 100:1. Optionally the Si:Al ratio of the ZSM-5 is from 22:1 to 28:1.

BRIEF DESCRIPTION OF THE DRAWINGS

In order that the invention may be more fully understood the following non-limiting Examples are provided by way of illustration only and with reference to the accompanying drawings in which.

DETAILED DESCRIPTION OF THE INVENTION

Figure 1:
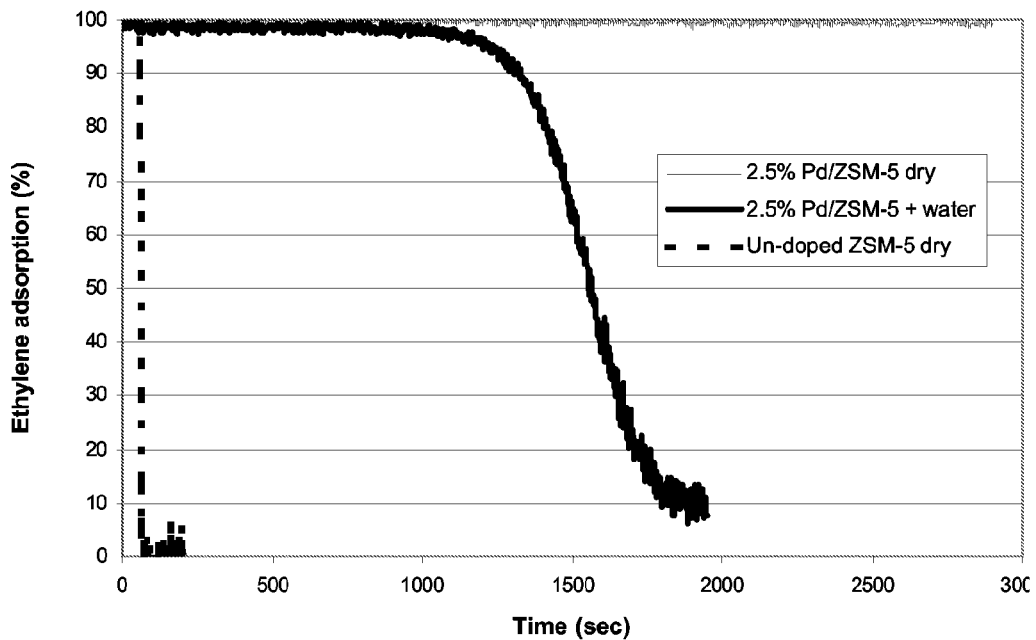
FIG. 1 is a graph showing ethylene adsorption over time by ZSM-5 doped with palladium (with and without water present in the gas feed, wet or dry) and un-doped ZSM-5, said graph demonstrating that it is the presence of palladium doping that enables ethylene adsorption.
Figure 2:
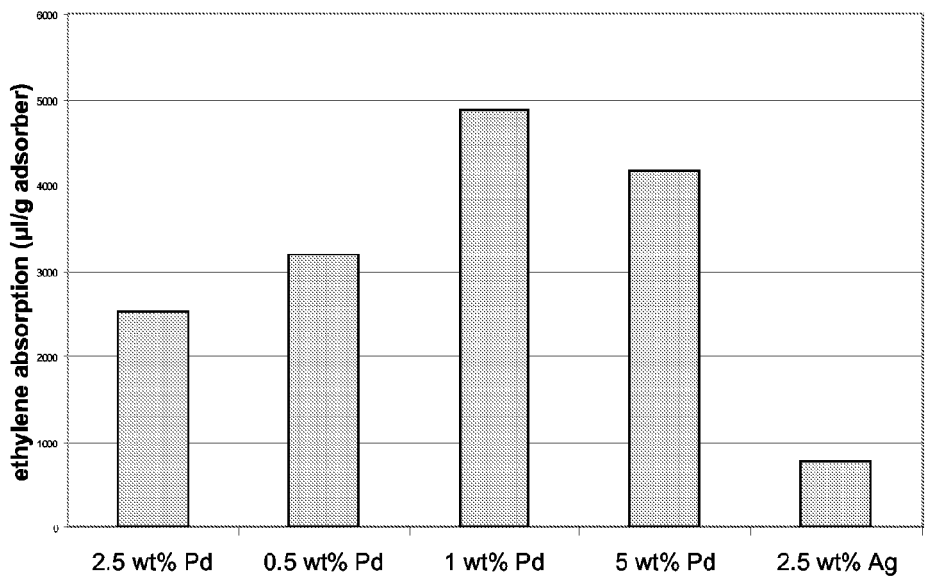
FIG. 2 is a graph showing ethylene adsorption by ZSM-5 with a $SiO_2$:$Al_2O_3$ ratio of 23 with different levels of palladium doping, varying from 0.5 wt % to 5 wt %, and for comparison silver doping at 2.5 wt %, said graph demonstrating the effectiveness of palladium doping over that of another metal and the variation in ethylene adsorption capacity with a change in level of doping.
Figure 3:
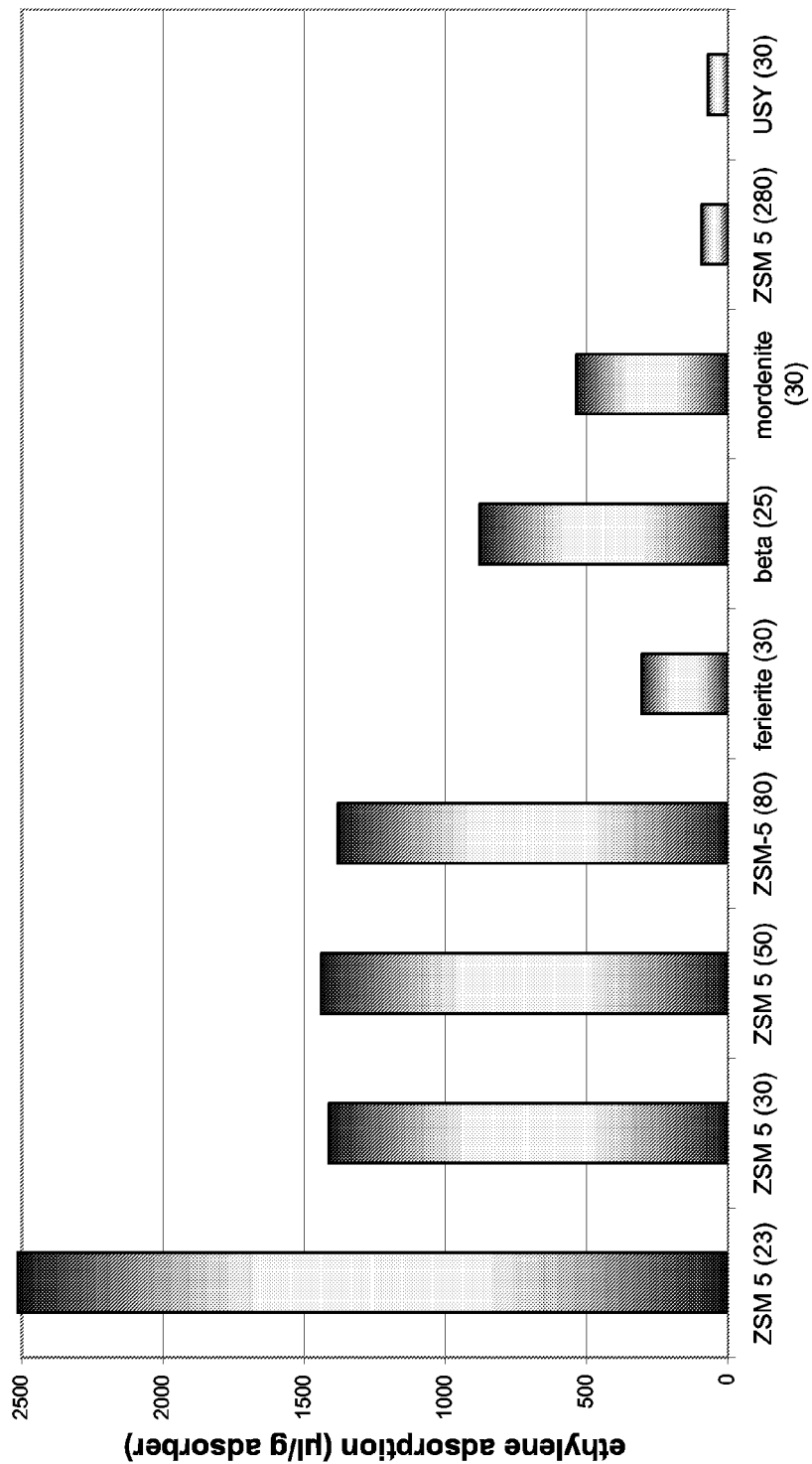
FIG. 3 is a graph showing ethylene adsorption by different palladium doped zeolites ($SiO_2$:$Al_2O_3$ ratios given in brackets), the Pd loading in all cases if 2.5 wt %, said graph showing that ethylene adsorption by palladium doped zeolites is greatest for ZSM-5 samples with a relatively low $SiO_2$:$Al_2O_3$ ratio.

At least a proportion of the adsorbed VOCs may be converted into secondary compounds after adsorption onto the doped ZSM-5.

In one embodiment the organic matter consists of perishable organic goods, such as items of food and horticultural produce. The items of food may comprise fruit and/or vegetables. The horticultural produce may comprise plants and/or cut flowers.

In another embodiment the organic matter comprises refuse. Such refuse may include kitchen refuse such as waste food, which produces unpleasant odours whilst decomposing.

The organic matter from which the VOCs are derived may be contained within a storage container or package, such that the doped ZSM-5 has a closed or semi-enclosed environment within which to adsorb the VOCs. In the case of perishable organic goods, the storage container or package is likely to be the container or package within which the goods are contained, e.g. crates used to store the goods when in transit or the packaging within which the goods are kept when on display prior to purchase. In another embodiment, the doped ZSM-5 is incorporated into, or into part of, the storage container or package itself. In a further embodiment, the doped ZSM-5 is incorporated into a label comprising a substrate for insertion and retention within a storage container or package.

If the perishable organic goods comprise items of food, the doped ZSM-5 may be packaged in a way to prevent direct contact with the food, e.g. behind a gas permeable barrier layer. The gas permeable barrier layer might form part of a sachet or label enclosing powdered doped ZSM-5 or the gas permeable layer could be affixed on top of a layer of ink comprising doped ZSM-5. The ink could be fixed to an internal surface of the storage container or package by printing, casting, roller application, brushing, spraying or like techniques. Additionally as the adsorption capacity of doped ZSM-5 is moderately sensitive to the presence of water (see Example 4), the doped ZSM-5 may be packaged with a water adsorbing material, such as silica gel.

If, however, the source of VOCs is refuse, the storage container or package may be a refuse receptacle.

Commonly, the doped ZSM-5 will be particulate and may be loosely packaged, such as within a sachet (see above). Alternatively, the particulate may be associated with another object, such as by being incorporated into a storage container, incorporated into an ink (see above) or simply coated onto another object, e.g. a ceramic or metal monolith, such as those used as catalyst carriers. Other forms of low pressure-drop substrates, such as those commonly used as catalyst carriers, may also be used. In another embodiment, the doped ZSM-5 is in the form of extrudates, pellets, tablets, grains or granules. The ZSM-5 may be doped before or after being formed into such extrudates, pellets, tablets, grains or granules.

Other methods of using the present invention may be used in appropriate circumstances.

One advantage associated with this invention is that the VOCs can be adsorbed at relatively low temperatures, such as in the range of from −10° C. to 50° C., more commonly from 0° C. to 30° C. This enables the doped ZSM-5 to be used in the environment within which the organic matter is commonly found, e.g. refrigerators or at ambient temperature, without requiring complex heating and air recirculation equipment to be used. Nonetheless, where a particular application allows for heating and air recirculation equipment to be used (e.g. an air conditioning system) the doped ZSM-5 may also be operated at an elevated temperature, e.g. above 60° C.

In one embodiment, the VOCs comprise ethylene. Ethylene is a gaseous hormone released by plants that can cause plants to wilt and fruits to ripen. The removal of VOCs produced by plants can delay these processes enabling food and horticultural produce to be kept in transit and/or in storage for longer without accelerating perishing. Therefore, a particular application of this invention is to industries that produce, ship, export and buy food and horticultural produce. Initial tests have suggested that, unlike prior art methods, the use of an adsorber according to this invention could enable the shelf life of post-climacteric fruit to be extended (Terry L, Ilkenhans T, Poulston S, Rowsell E and Smith A W J, *Postharvest Biol. and Tech.*—submitted). That is, even after the climacteric respiratory rise has been initiated, fruit may be prevented from ripening further (or at least the rate of ripening slowed) using palladium doped ZSM-5 to adsorb ethylene.

In another embodiment, the VOCs comprise formaldehyde and/or acetic acid. Formaldehyde and acetic acid are malodorous chemicals that are often found in the home. Formaldehyde may be released from pressed bonded wood products, such as plywood, but is also found in dyes, textiles, plastics, paper products, fertilizer, and cosmetics. Acetic acid may be released from kitchen waste and animal waste. Therefore, one potential application of this invention is to the removal of malodours from the domestic environment.

Another point of interest is that, although there is some loss of activity in the palladium doped ZSM-5 once they have been exposed to water, they are still able to function efficiently when "wet". As food and horticultural produce are usually stored in humid environments, this feature is also advantageous to the relevant industries.

Methods of manufacturing palladium doped ZSM-5 are known to the skilled chemist, and include the use of a variety of palladium salts, such as $Pd(NO_3)_2$, $Pd(OCH_3CO_2)_2$ and $PdCl_2$. Commonly, the ZSM-5 will be calcined after impregnation with at least one palladium salt, however, for some applications this may not be necessary. Samples of palladium doped ZSM-5 that are calcined will comprise at least partially oxidised palladium.

The palladium itself can comprise from 0.1 wt % to 10.0 wt % based on the total weight of the ZSM-5, optionally from 0.5 wt % to 5.0 wt % based on the total weight of the ZSM-5.

In one embodiment, the doped ZSM-5 is effective to adsorb the VOCs to a level of less than or equal to 0.10 ppm, optionally to a level of less than or equal to 0.05 ppm.

Another advantage of this invention is that the doped ZSM-5 may be used continuously for VOC removal for an extended period of time, e.g. several days, (the actual time depending upon the environment within which it is used). Furthermore, after use the ZSM-5 may be heated to 250° C. for 30 minutes in air to release the VOCs adsorbed on the ZSM-5 and any secondary compounds present, thus regenerating the palladium doped ZSM-5 for further use. This enables the palladium doped ZSM-5 to be used for extended periods of time, then removed from the source of VOCs, regenerated and re-used. As the regeneration process is neither lengthy nor costly, this means the doped ZSM-5 is a cost effective product for VOC removal. It is worth noting that, by contrast, regeneration of $KMnO_4$ is not possible as the material decomposes on heating to $K_2O$ and manganese oxide(s).

In order to identify the time when the doped ZSM-5 has reached its VOC adsorption capacity and therefore needs regenerating, a VOC indicator may be included for use with the doped ZSM-5. Suitable indicators include the palladium based ethylene indicator disclosed in patent application JP 60-201252.

In accordance with a second aspect of the present invention, there is provided palladium doped ZSM-5, wherein the Si:Al ratio of the ZSM-5 is less than or equal to 100:1 and the palladium comprises from 0.1 wt % to 10.0 wt % based on the total weight of the doped ZSM-5. Optionally, the Si:Al ratio of the ZSM-5 is from 22:1 to 28:1 and/or the palladium comprises from 0.5 wt % to 5.0 wt % based on the total weight of the doped ZSM-5.

EXAMPLE 1

Preparation of Doped Supports

Doped supports, also known as adsorbers, were prepared using the incipient wetness impregnation method. Typically 20 g of the support (e.g. the hydrogen form of the zeolite) was impregnated with the nitrate salt or chloride salt of the appropriate metal (e.g. palladium), and then dried at 110° C. before being calcined in air at 500° C. for 2 hrs.

EXAMPLE 2

Ethylene Adsorption Measurements

Measurements were carried out in a plug flow reactor at 21° C. with 0.1 g doped support of particle size 250-355 μm with a flow rate of 50 ml/min of gas comprising 10% $O_2$, 200 ppm $C_2H_4$, ~1% water (where present) and balance He/Ar.

EXAMPLE 3

Ethylene Adsorption by Pd Doped onto a Variety of Supports

Samples of 4.0 wt % Pd doped activated carbon and 2.5 wt % Pd/ZSM-5(23) were made according to Example 1 (using palladium chloride salt and palladium nitrate respectively) and various activated carbons. The samples were tested for their ethylene adsorption capacity, in accordance with Example 2. The results are set out below:

| Adsorber | Ethylene adsorption/μl $g^{-1}$ |
| --- | --- |
| Pd/ZSM-5 | 32228 |
| PdCl/C (black pearl) | 372 |
| PdCl/C (denka) | 80 |
| PdCl/C (vulcite) | 132 |
| PdCl/C (ketjen) | 292 |
| PdCl/C (xc-72R) | 205 |

This experiment shows that Pd/ZSM-5 has a far higher adsorption capacity than Pd doped activated carbon.

EXAMPLE 4

"Wet" Ethylene Adsorption by Metal Doped ZSM-5 and $KMnO_4$ on $Al_2O_3$

Samples of 2.5 wt % Pd/ZSM-5(23), made according to Example 1, and samples of 5 wt % $KMnO_4$ on $Al_2O_3$ (Condea, 140 $m^2$/g) were tested for their ethylene adsorption capacity, in accordance with Example 2. The materials were tested when dry and after having been exposed to water by being placed in a dessicator containing water at ambient temperature for a set period of time. The results of this experiment are set out in the table below:

| Adsorber | Pre-treatment | Ethylene adsorption/μl $g^{-1}$ |
| --- | --- | --- |
| Pd/ZSM-5 | Calcined in air at 500° C. | 4162 |
| Pd/ZSM-5 | Calcined in air at 500° C., exposed to water vapour for 100 hrs at 21° C. | 3753 |
| $KMnO_4/Al_2O_3$ | Dried 110° C. | 750 |
| $KMnO_4/Al_2O_3$ | Dried 110° C., exposed to water vapour for 72 hrs at 21° C. | 0 |

Additionally, samples of 2.5 wt % M/ZSM-5, M=Pt, Co, Ni, Rh, Ru, Ir, Mo, Cu, W, V, and Au, (all with a $SiO_2:Al_2O_3$ ratio of 23) were made according to Example 1 and tested for their ethylene adsorption capacity after having been exposed to water as above. The ethylene adsorption capacities measured were less than 60 μl $g^{-1}$ catalyst for all of the samples.

This experiment shows that the palladium doped zeolite only loses approximately 10% of its dry ethylene adsorption capacity when wet. All the other metals tested show negligible ethylene adsorption when wet, whilst $KMnO_4$ on $Al_2O_3$ loses all of its ethylene adsorption function when wet.

EXAMPLE 5

Adsorption of Ethylene from Fruit

A banana (weighing approximately 150 g) was placed in an airtight vessel of volume 1.15 liters and left for approximately 1 day. Increase in $CO_2$ and ethylene concentration was measured as a function of time using Gas Chromatography. The experiment was then repeated with 0.2 g adsorber (2.5 wt % Pd/ZSM-5) present in the vessel.

Figure 4:
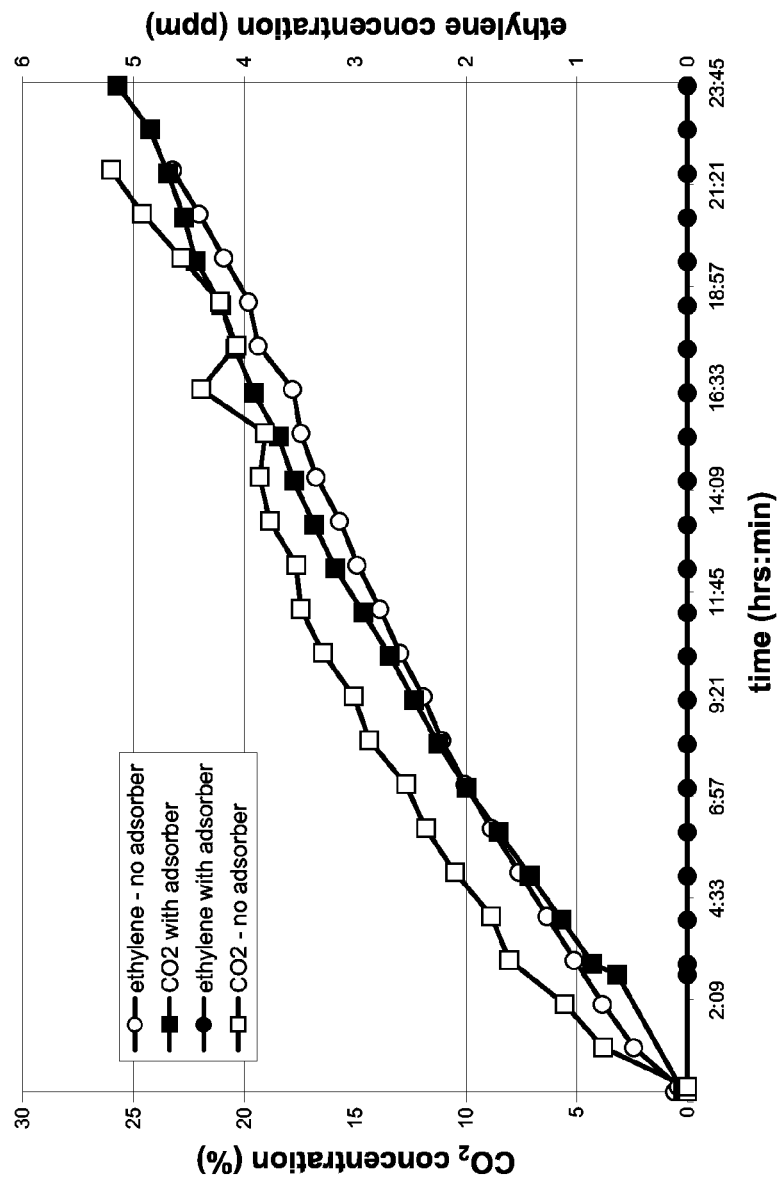
FIG. 4 is a graph showing the $CO_2$ and ethylene concentrations measured in an example using a banana as the organic matter from which the ethylene is derived (see Example 5 for further discussion)

As can be seen with reference to FIG. 4, the banana alone led to an approximately linear increase in both $CO_2$ and ethylene concentrations, whereas when the adsorber was present there was no detectable increase in ethylene concentration whilst the concentration of $CO_2$ increased at approximately the same rate as before indicating a similar respiration rate.

Further experiments were carried out with a variety of fruit being placed in the same airtight vessel and left for approximately 20 hours to yield the following results:

| Fruit | Fruit weight/g | Adsorber | Ethylene Concentration/ppm |
| --- | --- | --- | --- |
| Banana | 140 | none | 5.5 |
| Banana | 140 | un-doped ZSM-5 (23) | 3.9 |
| Banana | 156 | 1 wt % Pd/ZSM-5 (23) | 0.0 |
| Banana | 137 | 2.5 wt % Pd/ZSM-5 (23) | 0.0 |
| Peach | 114 | none | 35.0 |
| Peach | 114 | 2.5 wt % Pd/ZSM-5 (23) | 1.5 |
| Apple | 148 | none | 316.4 |
| Apple | 148 | 1 wt % Pd/ZSM-5 (23) | 17.2 |
| Tomato | 208 | none | 1.4 |
| Tomato | 207 | 2.5 wt % Pd/ZSM-5 (23) | 0.0 |
| Pear | 156 | none | 42.9 |
| Pear | 156 | 1 wt % Pd/ZSM-5 (23) | 1.7 |
| Passion Fruit | 60.9 | none | 109.9 |
| Passion Fruit | 60.6 | 2.5 wt % Pd/ZSM5 (23) | 13.7 |

EXAMPLE 6

Ethylene Adsorption Using a Monolith

Figure 5:
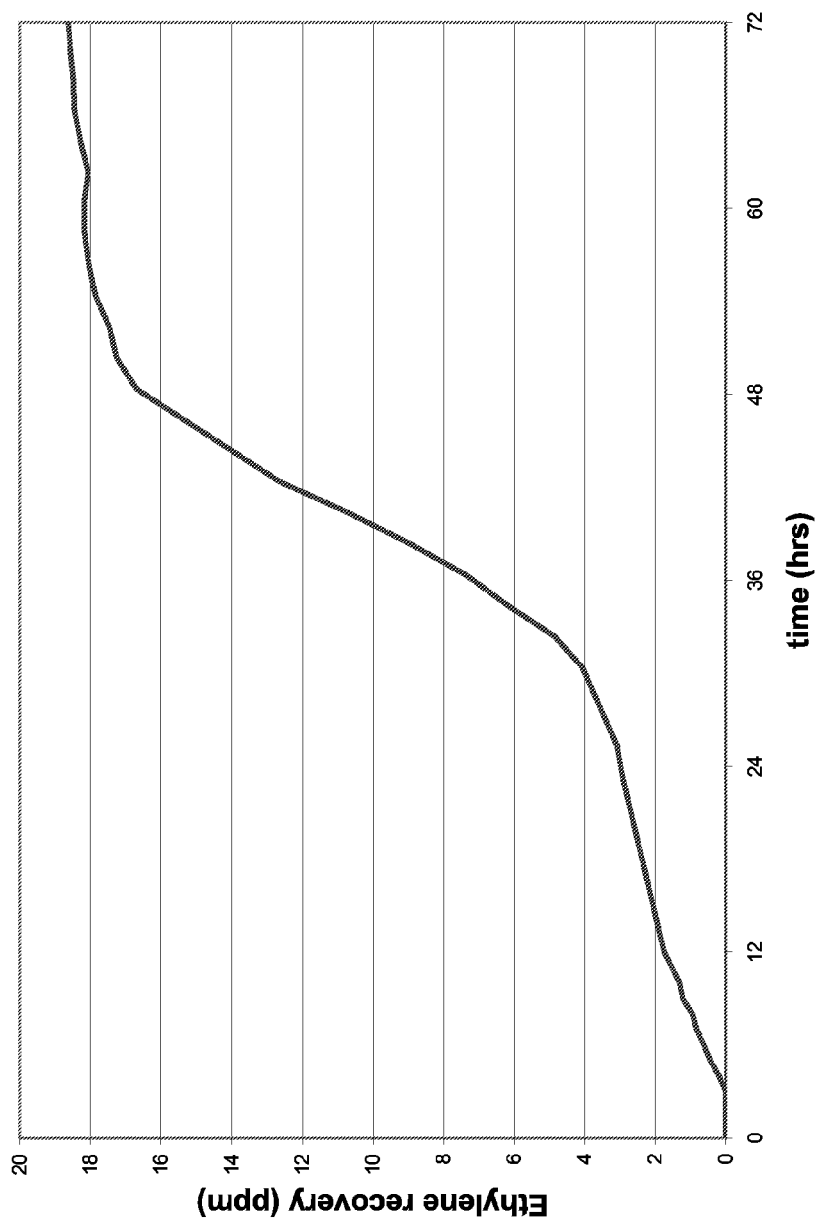
FIG. 5 is a graph showing ethylene adsorption by a monolith coated with 2.5 wt % Pd/ZSM-5.

A 900 cpsi (cells per square inch) cordierite catalyst monolith, of the type commonly used in vehicle exhaust catalysts, weighing 3 g with dimensions of 2.2 cm diameter and 2.5 cm length, was coated with a 2.5 wt % Pd/ZSM-5 slurry. The slurry was prepared using finely milled doped ZSM-5 suspended in water (the doped ZSM-5 was prepared according to the method described in Example 1). The washcoat load was 0.28 g/$cm^2$. The monolith was tested for its ethylene adsorption capacity in an ITK rig at a flow rate of 10 ml/min using gas comprising 10% $O_2$, 20 ppm $C_2H_4$ and balance Ar. The results of the test may be seen in FIG. 5

This experiment shows that the adsorber coated monolith is able to remove almost all the ethylene present over the course of several days. (Additional experiments showed that the ethylene adsorption rate speeded up when the temperature at which the experiment was carried out was increased).

EXAMPLE 7

Ethylene Adsorption in the Presence of an Indicator

An ethylene indicator was prepared following patent application JP 60-201252 (essentially an acidified solution of ammonium molybdate and palladium sulphate impregnated onto a porous support). When exposed to ethylene, this material changed colour from light yellow to dark blue/black.

0.5 g of indicator was placed in a 1 liter glass beaker on its own, with only an apple, and with an apple and 0.2 g of ethylene adsorber being present (i.e. beaker 1=sensor only, beaker 2=fruit+indicator and beaker 3=fruit+adsorber+indicator). Each beaker was sealed with cling film and left for 72 hours. At 24 hour intervals, each ethylene sensor powder was removed and the colour measured on a Spectroflash 500 series colorimeter. The CIELAB Lightness scale (L) was used to monitor the change in lightness of the sensor powder, where a value of 100 is white and a value of 0 is black.

A sample of the ethylene indicator was also exposed to 1000 ppm ethylene for 24 hours. The colour measurements of this sample and a fresh sample were also recorded for reference.

Figure 6:
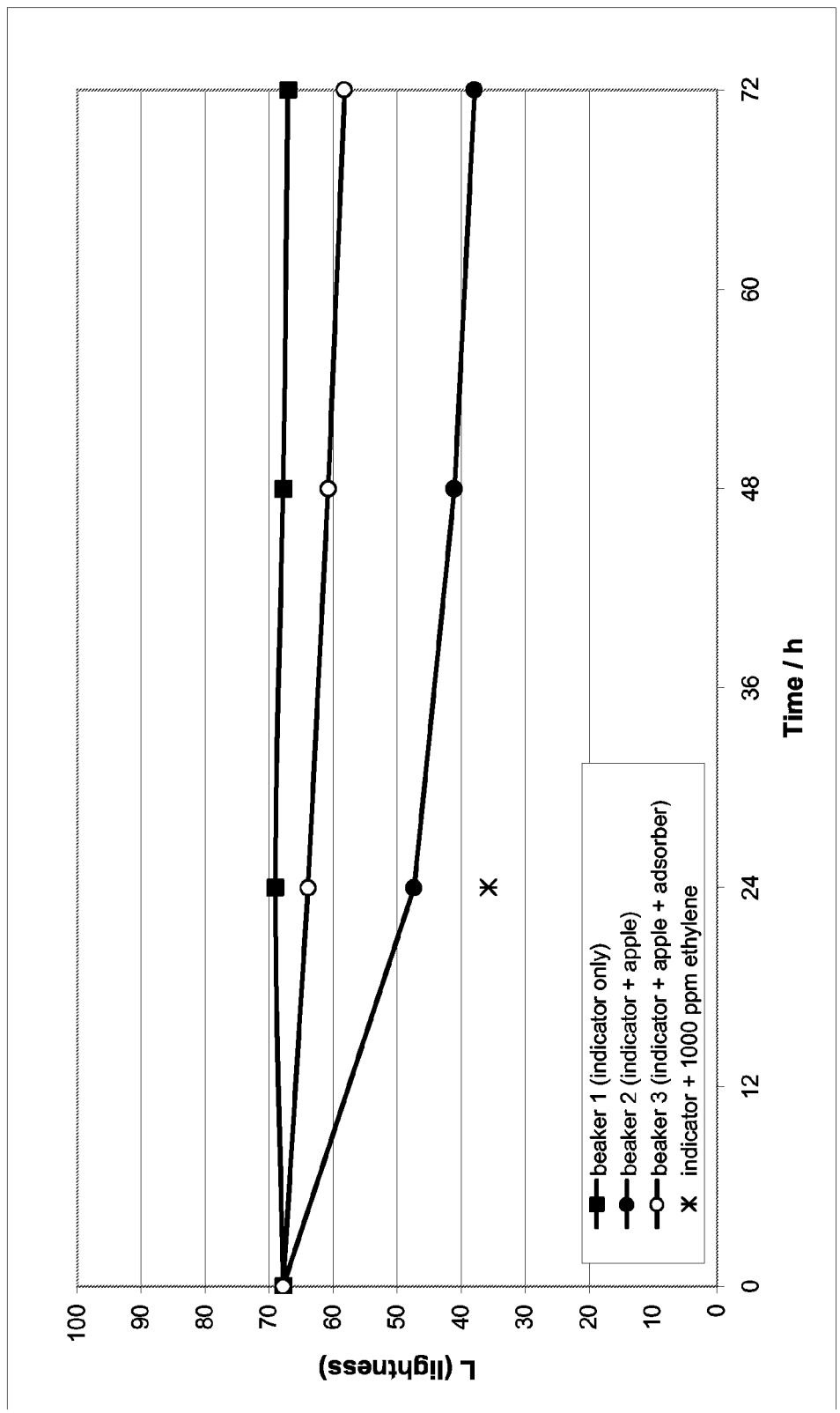
FIG. 6 is a graph showing the lightness of an ethylene indicator after exposure to an apple, an apple and adsorber, and the indicator on its own (with a reference measurement of the indicator on its own after exposure to ethylene).

As can be seen with reference to FIG. 6, ethylene from the apple without scavenger has darkened the indicator after 72 hours to almost the same extent as the sample of the ethylene indicator exposed to 1000 ppm ethylene for 24 hours. The colour of the sensor powders in beakers containing the fruit with the adsorber have not darkened as much, showing that the ethylene adsorber is removing ethylene. Samples of ethylene sensor sealed in empty beakers did not change colour significantly over the 72 hours.

EXAMPLE 8

Formaldehyde and Acetic Acid Adsorption

Measurements were carried out using a saturator at 21° C. with 0.1 g doped ZSM-5(23) of particle size 250-355 µm with a flow rate of 50 ml/min of gas comprising 10% $O_2$, 300 ppm $CH_2O$ or $CH_3COOH$ and balance He/Ar.

The formaldehyde adsorption capacity of 2.5 wt % Pd/ZSM-5(23) was found to be 9750 µl/g adsorber. The acetic acid adsorption capacity of 2.5 wt % Pd/ZSM-5(23) was found to be 29241 µl/g adsorber.

What is claimed:

1. An article comprising:
    packaging or a container configured to hold organic matter;
    a volatile organic compound ("VOC") adsorber, the VOC adsorber comprising
        palladium doped hydrogen ZSM-5 wherein the Si:Al ratio of the hydrogen ZSM-5 is less than or equal to 100:1 and the palladium comprises from 0.1 wt % to 10.0 wt % based on the total weight of the doped hydrogen ZSM-5.

2. The article according to claim 1, wherein the Si:Al ratio of the hydrogen ZSM-5 is from 22:1 to 28:1.

3. The article according to claim 1, wherein the palladium comprises from 0.5 wt % to 5.0 wt % based on the total weight of the doped hydrogen-ZSM-5.

4. The article according to claim 1, wherein the VOC adsorber is incorporated into, or into part of, the packaging or container.

5. The article according to claim 1, wherein the VOC adsorber is in the form of a label, sachet, or ink.

6. The article according to claim 1, wherein the VOC adsorber is retained within the packaging or container.

7. The article according to claim 1, wherein the VOC adsorber is associated with a label, and further wherein the label has a substrate for insertion and retention within the packaging or container.

8. The article according to claim 1, wherein the storage container or package is a refuse receptacle.

9. The article according to claim 1, wherein the VOC adsorber is capable of being regenerated.

10. A method for removing volatile organic compounds (VOCs) derived from organic matter comprising the steps of:
    positioning the VOC adsorber in an environment with organic matter, wherein the VOC adsorber comprises palladium doped hydrogen ZSM-5 wherein the Si:Al ratio of the hydrogen ZSM-5 is less than or equal to 100:1 and the palladium comprises from 0.1 wt % to 10.0 wt % based on the total weight of the doped hydrogen ZSM-5;
    adsorbing the VOCs derived from organic matter onto the VOC adsorber; and
    regenerating the VOC adsorber.

11. The method according to claim 10, wherein the step of adsorbing the VOCs onto the VOC adsorber prolongs the shelf-life of organic matter.

12. The method according to claim 10 further comprising:
    adsorbing the VOCs derived from organic matter onto the VOC adsorber after regenerating the VOC adsorber.

13. The method according to claim 12, wherein the step of adsorbing the VOCs onto the regenerated VOC adsorber prolongs the shelf-life of organic matter.

14. The method according to claim 11, wherein the shelf-life of the organic matter is prolonged when the organic matter is in transit and/or storage.

15. The method according to claim 12, wherein the shelf-life of the organic matter is prolonged when the organic matter is in transit and/or storage.

16. The method according to claim 11, wherein the shelf-life of the organic matter is prolonged during production, shipping, exportation or purchase of the organic matter.

17. A method according to claim 10, wherein the organic matter consists of perishable organic goods.

18. A method according to claim 17, wherein the perishable organic goods comprise items of food.

19. A method according to claim 18, wherein the items of food comprise fruit and/or vegetables.

20. A method according to claim 17, wherein the perishable organic goods comprise horticultural produce.

21. A method according to claim 20, wherein the horticultural produce comprises plants and/or cut flowers.

22. The method according to claim 10, wherein the step of adsorbing the VOCs onto the VOC adsorber reduces an odour.

23. The method according to claim 12, wherein the step of adsorbing the VOCs onto the regenerated VOC adsorber reduces an odour.

24. The method according to claim 22, wherein the odour is produced from decomposing organic matter.

25. The method according to claim 24, wherein the organic matter comprises refuse.

26. A method according to claim 10, wherein the step of regenerating the VOC adsorber comprises heating the VOC adsorber in air to release the VOCs adsorbed onto the VOC adsorber and any secondary compounds present.

27. The method according to claim 10 further comprising identifying when the VOC adsorber needs to be regenerated by using a VOC indicator.

28. The method according to claim 10, wherein the Si:Al ratio of the hydrogen-ZSM-5 is from 22:1 to 28:1.

29. The method according to claim 10, wherein the palladium comprises from 0.5 wt % to 5.0 wt % based on the total weight of the doped hydrogen-ZSM-5.

30. The method according to claim 10, wherein said adsorbing occurs at one or more temperatures between −10 and 30° C.

* * * * *